(12) United States Patent
Li

(10) Patent No.: US 12,092,182 B2
(45) Date of Patent: Sep. 17, 2024

(54) THREE-DIMENSIONAL AUXETIC COMPOSITE STRUCTURES

(71) Applicant: Northeastern University, Boston, MA (US)

(72) Inventor: Yaning Li, Durham, NH (US)

(73) Assignee: Northeastern University, Boston, MA (US)

( * ) Notice: Subject to any disclaimer, the term of this patent is extended or adjusted under 35 U.S.C. 154(b) by 216 days.

(21) Appl. No.: 17/742,777

(22) Filed: May 12, 2022

(65) Prior Publication Data
US 2022/0381315 A1 Dec. 1, 2022

Related U.S. Application Data

(60) Provisional application No. 63/193,769, filed on May 27, 2021.

(51) Int. Cl.
| | |
|---|---|
| *F16F 13/04* | (2006.01) |
| *F16F 1/36* | (2006.01) |
| *F16F 1/37* | (2006.01) |
| *F16F 1/371* | (2006.01) |
| *F16F 3/093* | (2006.01) |

(52) U.S. Cl.
CPC ............ *F16F 13/04* (2013.01); *F16F 1/3615* (2013.01); *F16F 1/3716* (2013.01); *F16F 3/093* (2013.01); *F16F 2224/0225* (2013.01); *F16F 2230/36* (2013.01)

(58) Field of Classification Search
CPC .......... F16F 1/36; F16F 1/3615; F16F 1/3716; F16F 1/371; F16F 1/377; F16F 3/093; F16F 13/04; F16F 2224/02; F16F 2224/0225; F16F 2230/36; F16F 2236/103

USPC ......................................... 267/152, 153, 292
See application file for complete search history.

(56) References Cited

U.S. PATENT DOCUMENTS

| | | | | |
|---|---|---|---|---|
| 9,382,962 | B2* | 7/2016 | Scarpa | F16F 7/121 |
| 9,494,206 | B2* | 11/2016 | Rajasekaran | F16F 3/093 |
| 10,206,454 | B2* | 2/2019 | Langvin | A43B 13/141 |
| 10,878,791 | B2* | 12/2020 | Martino | B32B 3/18 |

(Continued)

FOREIGN PATENT DOCUMENTS

| | | | | |
|---|---|---|---|---|
| CN | 104763772 | A * | 7/2015 | |
| CN | 209955314 | U * | 1/2020 | B22F 3/1055 |

(Continued)

OTHER PUBLICATIONS

Mechanical properties of 3D re-entrant honeycomb auxetic structures realized via additive manufacturing (Year: 2015).*
CN-111255834-A (Year: 2020).*

*Primary Examiner* — Thomas J Williams
(74) *Attorney, Agent, or Firm* — Foley Hoag LLP

(57) ABSTRACT

An auxetic structure includes a plurality of polyhedral units arranged adjacent one another to form a three-dimensional structure. Each polyhedral unit has protrusions extending orthogonally from some surfaces thereof and recesses formed in other surfaces thereof. The protrusions of each polyhedral unit are slidingly received in corresponding recesses of adjacent polyhedral units. A plurality of sleeves are positioned around each protrusion and in a corresponding recess. The sleeves are formed from a softer material than the protrusions. An auxetic effect is achieved by shear-induced displacement of the protrusions in corresponding recesses.

19 Claims, 8 Drawing Sheets

(56) References Cited

U.S. PATENT DOCUMENTS

2020/0023584 A1\* 1/2020 Portela .................... B29C 64/30
2022/0233944 A1\* 7/2022 Alarifi ................ A63B 71/1225
2022/0381315 A1\* 12/2022 Li .......................... F16F 1/021

FOREIGN PATENT DOCUMENTS

CN 111255834 A \* 6/2020
DE 102019218060 A1 \* 5/2021

\* cited by examiner

THREE-DIMENSIONAL AUXETIC COMPOSITE STRUCTURES

CROSS REFERENCE TO RELATED APPLICATIONS

This application claims priority from U.S. Provisional Patent Application No. 63/193,769 filed on May 27, 2021 entitled THREE-DIMENSIONAL AUXETIC TILED COMPOSITES, which is hereby incorporated by reference.

BACKGROUND

The present application relates generally to auxetic materials and, more particularly, to three-dimensional (3D) auxetic composite structures.

Materials with a negative Poisson's ratio have a wide range of engineering applications due to their auxeticity-induced superior mechanical properties, including increased indentation resistance, shear resistance, and energy absorption. One type of widely used auxetic material is an auxetic cellular solid, which is both lightweight and flexible. However, for many such materials under compression, the auxetic effects can only be preserved for very small strains (<5%). Also, they are compliant (by an order of magnitude lower than the component material) due to their low density, which limits their usefulness for many engineering applications.

Also, for many auxetic cellular solids, the Poisson's ratio changes during the deformation process, and cannot be controlled as a constant during the deformation. As a result, their auxetic effects are not stable during deformation.

BRIEF SUMMARY OF THE DISCLOSURE

An auxetic structure in accordance with one or more embodiments includes a plurality of polyhedral units arranged adjacent one another to form a three-dimensional structure. Each polyhedral unit has protrusions extending orthogonally from some surfaces thereof and recesses formed in other surfaces thereof. The protrusions of each polyhedral unit are slidingly received in corresponding recesses of adjacent polyhedral units. A plurality of sleeves are positioned around each protrusion and in a corresponding recess. The sleeves comprise a softer material than the protrusions. An auxetic effect is achieved by shear-induced displacement of the protrusions in corresponding recesses.

An auxetic structure in accordance with one or more further embodiments includes a plurality of polyhedral units arranged adjacent one another to form a three-dimensional structure. Each polyhedral unit includes wavy outer surfaces having protrusions and recesses thereon, wherein the protrusions of each polyhedral unit are slidingly received in corresponding recesses of adjacent polyhedral units. The structure also includes a plurality of interfacial layers, each between two adjacent polyhedral units. The interfacial layers comprise a softer material than said polyhedral units. An auxetic effect is achieved by shear-induced displacement of the protrusions in corresponding recesses.

BRIEF DESCRIPTION OF THE DRAWINGS

FIG. 1A shows a 3×3 unit cell of the 3D structure. FIG. 1B shows a representative volume element (RVE) of the structure. FIG. 1C shows the FE simulation results of the overall Poisson's ratio vs. overall compressive strain for the structure. FIG. 1D shows the FE von-Mises stress contour of the RVE under uni-axial compression.

FIG. 2A shows five different exemplary structures comprising convex polyhedral building blocks with flat interfaces: a cubic structure, a hexagonal prism structure, a triangular prism structure, a truncated octahedron structure, and a gyrobifastigium structure. FIG. 2B shows a Voronoi polyhedral structure in accordance with one or more embodiments. FIG. 2C shows further details of a cubic structure.

Like or identical reference numbers are used to identify common or similar elements.

DETAILED DESCRIPTION

Various embodiments disclosed herein relate to 3D auxetic composite structures. Compared with auxetic cellular solids, auxetic composite structures in accordance with various embodiments exhibit both high stiffness (comparable to the stiffness of the component material) and robust auxetic behavior. The robust auxeticity under both small and large deformations can retard crack propagation. Due to unique interior-shear-dominant deformation mechanisms, they also have high energy dissipation and high damping capabilities. As a result, the composite structures are good candidates for many impact-resistance and anti-vibration applications.

Figure 1B:
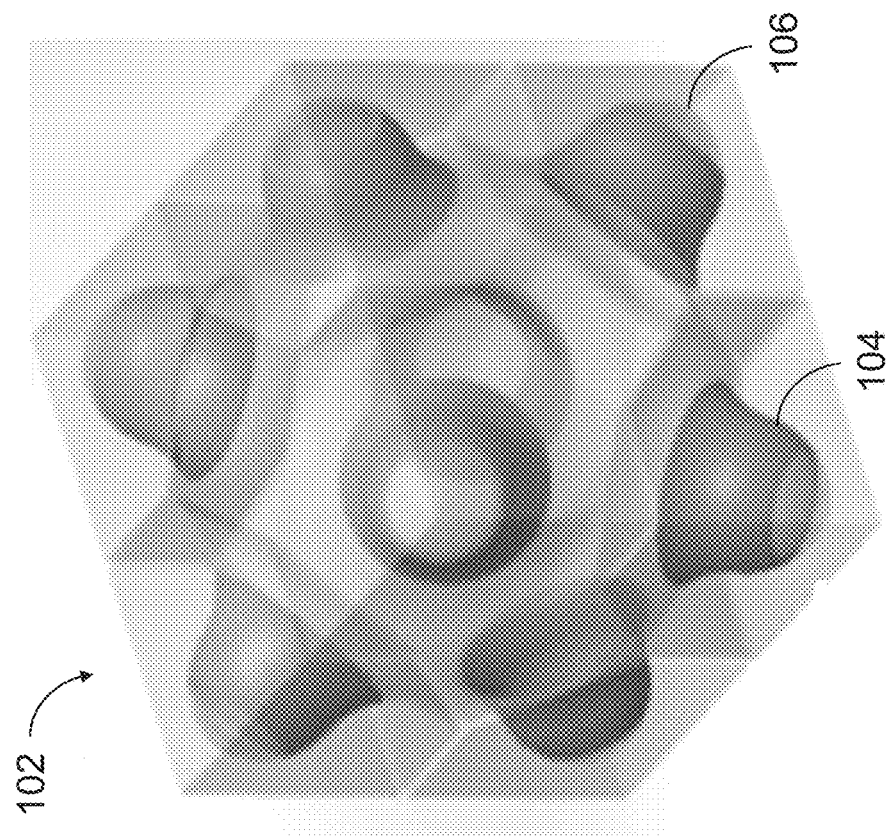
FIGS. 1A-1D illustrate an exemplary 3D auxetic composite structure with a negative Poisson's ratio in accordance with one or more embodiments and finite element (FE) simulation results.
Figure 1A:
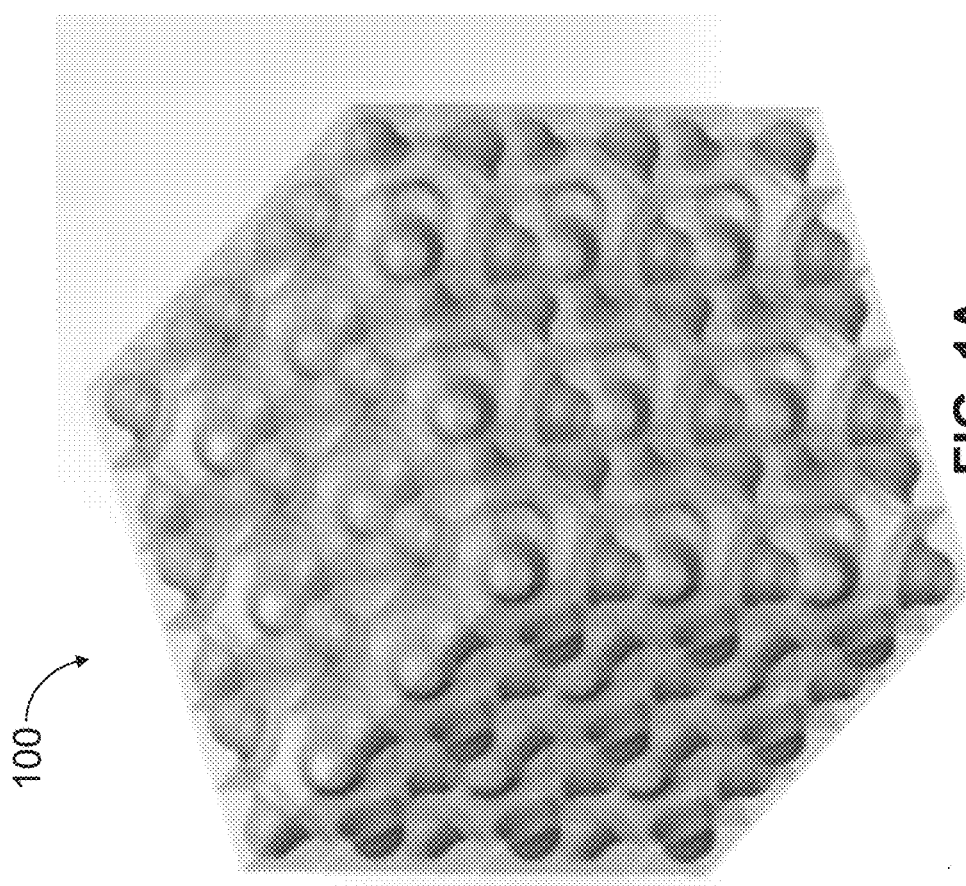

FIGS. 1A and 1B show one example of a 3D auxetic composite structure 100 in accordance with one or more embodiments. The representative volume element (RVE) 102 of the structure 100 is shown in FIG. 1B.

The building blocks in the structure 100 have a polyhedral geometry. In this embodiment, the building blocks each have a truncated octahedral geometry. A 3D wavy soft layer (or sleeve) 104 is disposed on the boundary between neighboring polyhedral units around buttons or protrusions 106 extending from the polyhedral surfaces. The polyhedral units including the buttons 106 comprise a stiff or rigid material, and the wavy layer 104 comprises a softer material.

Figure 1C:
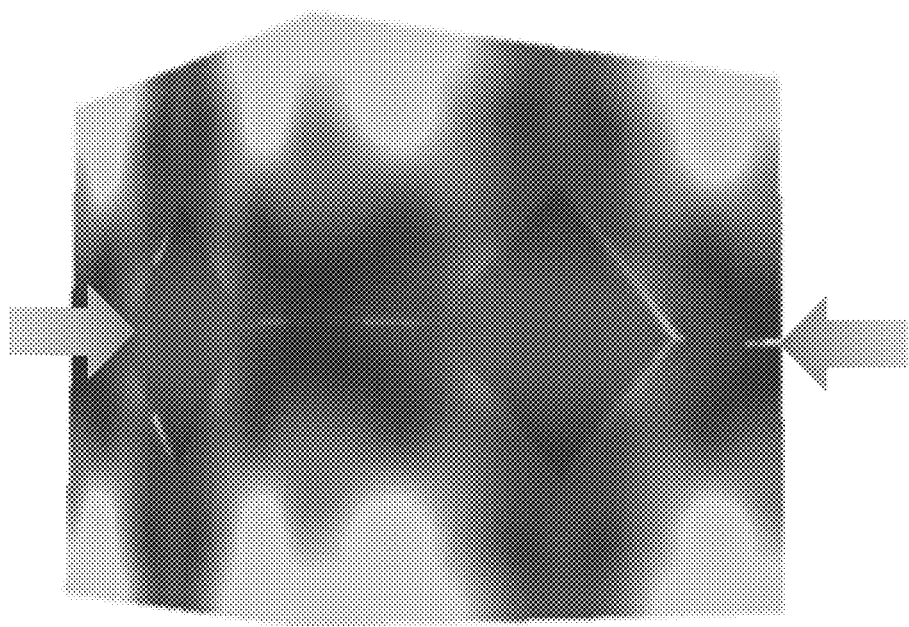
Figure 1D:
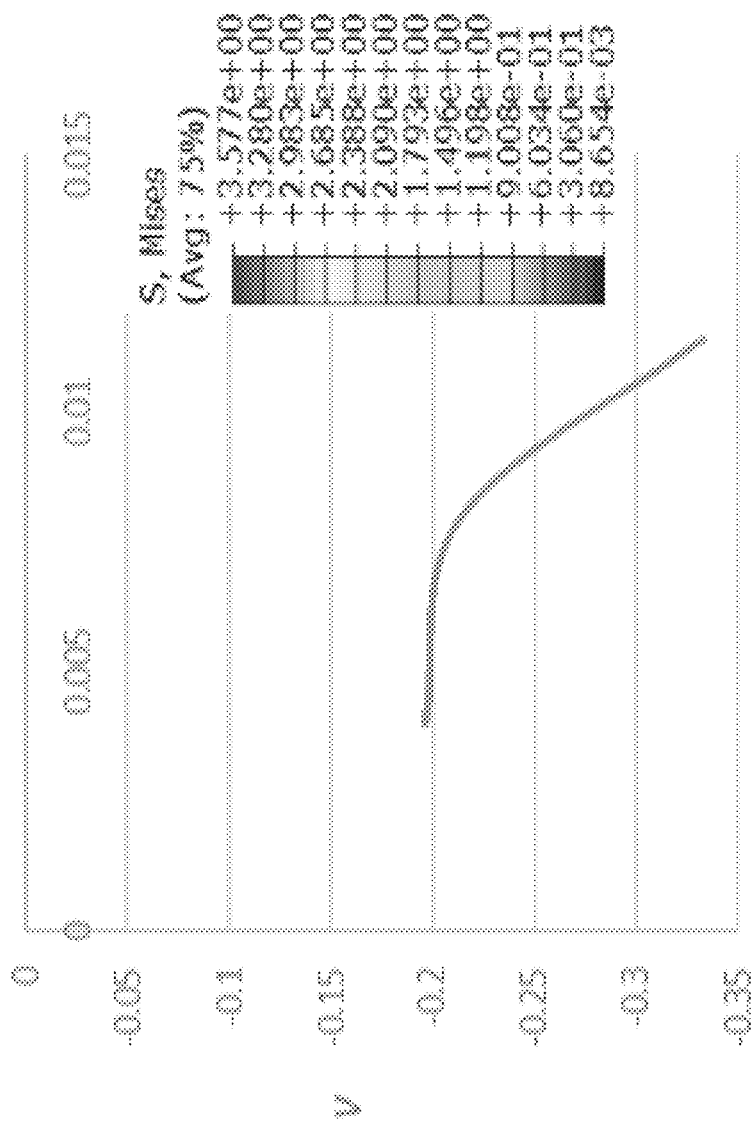

The lateral strain in the other two orthogonal directions were output and used to compute the overall Poisson's ratio of the structure 100. The overall Poisson's ratio vs. the compressive strain curve is shown in FIG. 1C. A negative Poisson's ratio of about −0.2 to −0.3 was observed. The von-Mises stress contour of the RVE 102 is shown in FIG. 1D. Due to symmetry of the structure 100, the same negative Poisson's ratio was observed in all three directions. The 3D composite structure 100 thus exhibits auxeticity in all three directions.

Figure 1F:
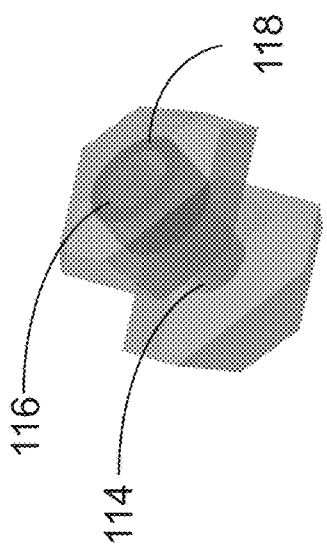
FIGS. 1E and 1F illustrate an alternate exemplary 3D auxetic composite structure with a negative Poisson's ratio in accordance with one or more embodiments.
Figure 1E:
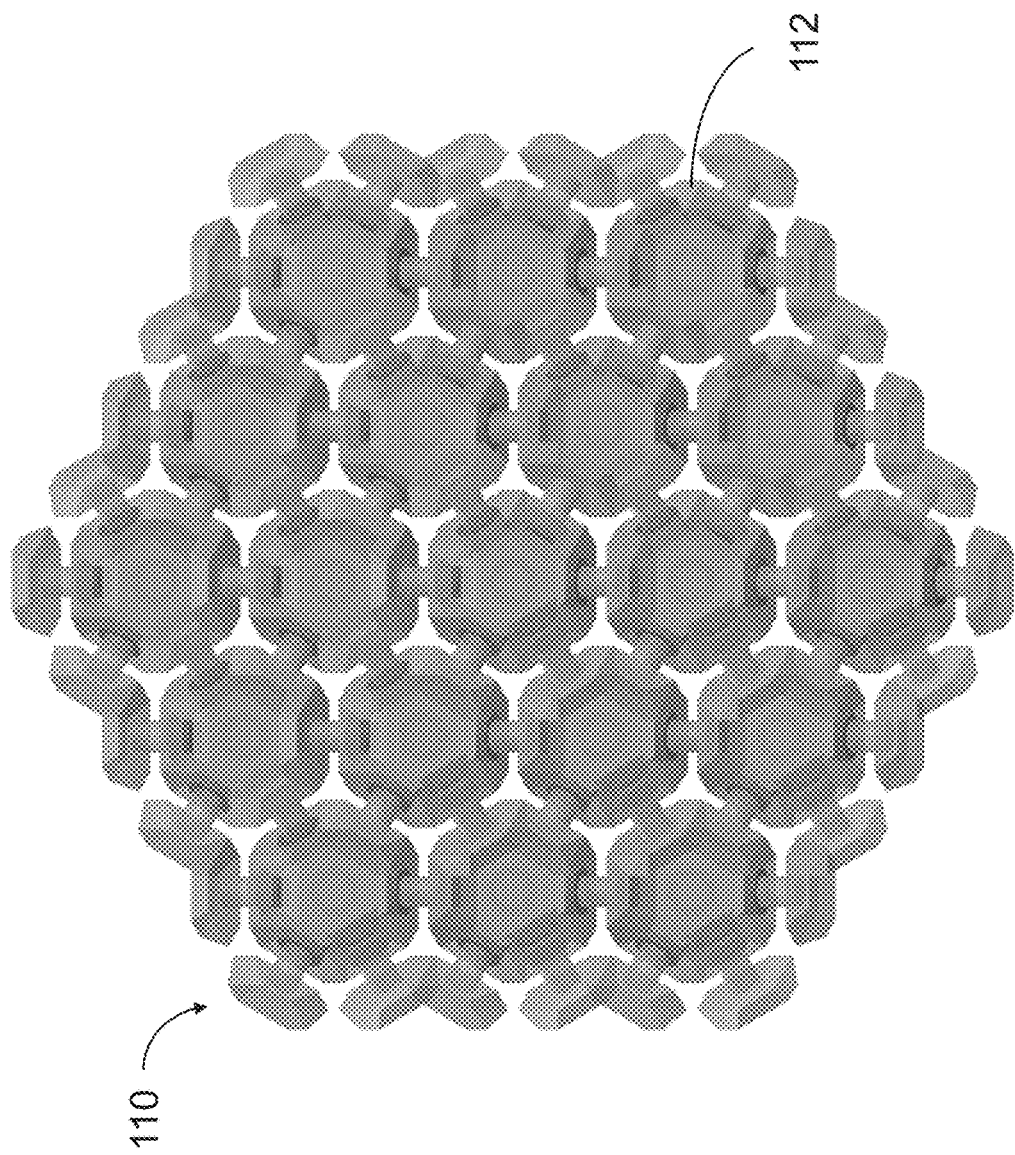

FIG. 1E shows an alternate three-dimensional auxetic composite structure 110 in accordance with one or more embodiments. FIG. 1F is an enlarged view of a portion of the structure 110 provided to more clearly show features of the structure. The structure 110 includes a plurality of polyhedral units or building blocks 112 arranged adjacent one another to form a three-dimensional structure. Each polyhedral unit 112 has protrusions 114 extending orthogonally from some surfaces thereof and recesses 116 formed in other surfaces thereof. The protrusions 114 of each polyhedral unit 112 are slidingly received in corresponding recesses 116 of adjacent polyhedral units 112. A plurality of cylindrical sleeves 118 are disposed around each protrusion 114 and in a corresponding recess 116. The sleeves 118 thus form interfaces between adjacent units 112. The sleeves 118 comprise a softer material than the protrusions 114 such that an auxetic effect is achieved by shear-induced displacement of the protrusions 114 in corresponding recesses 116.

Figure 2A:
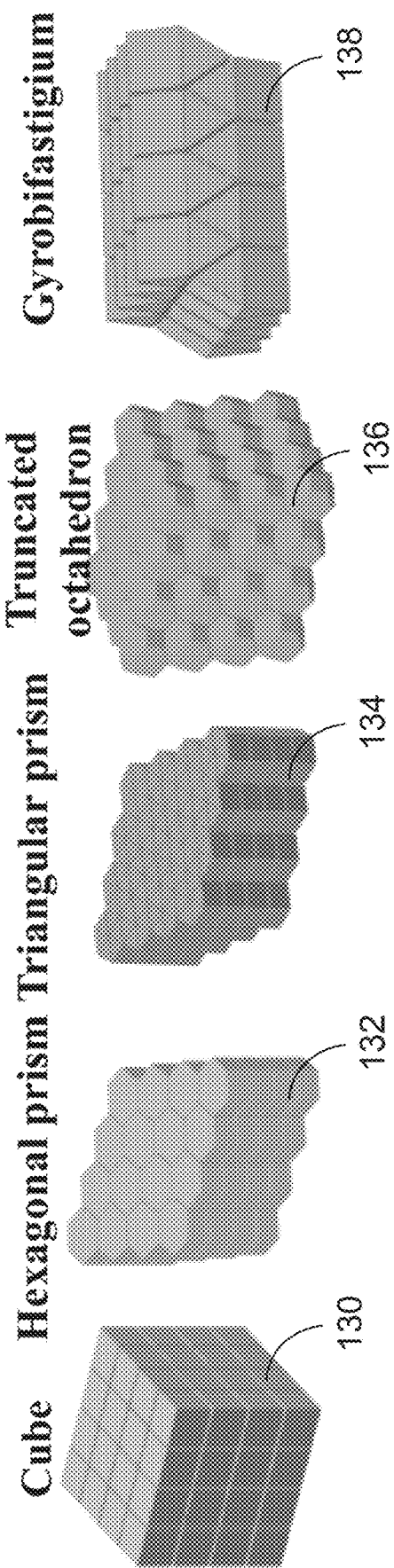
FIGS. 2A-2C show examples of additional 3D auxetic composite structures in accordance with one or more embodiments.
Figure 2B:
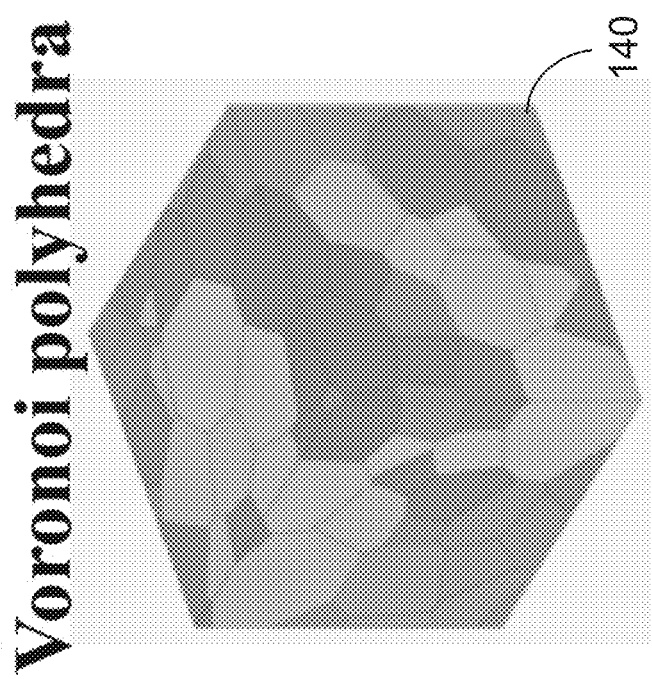
Figure 2C:
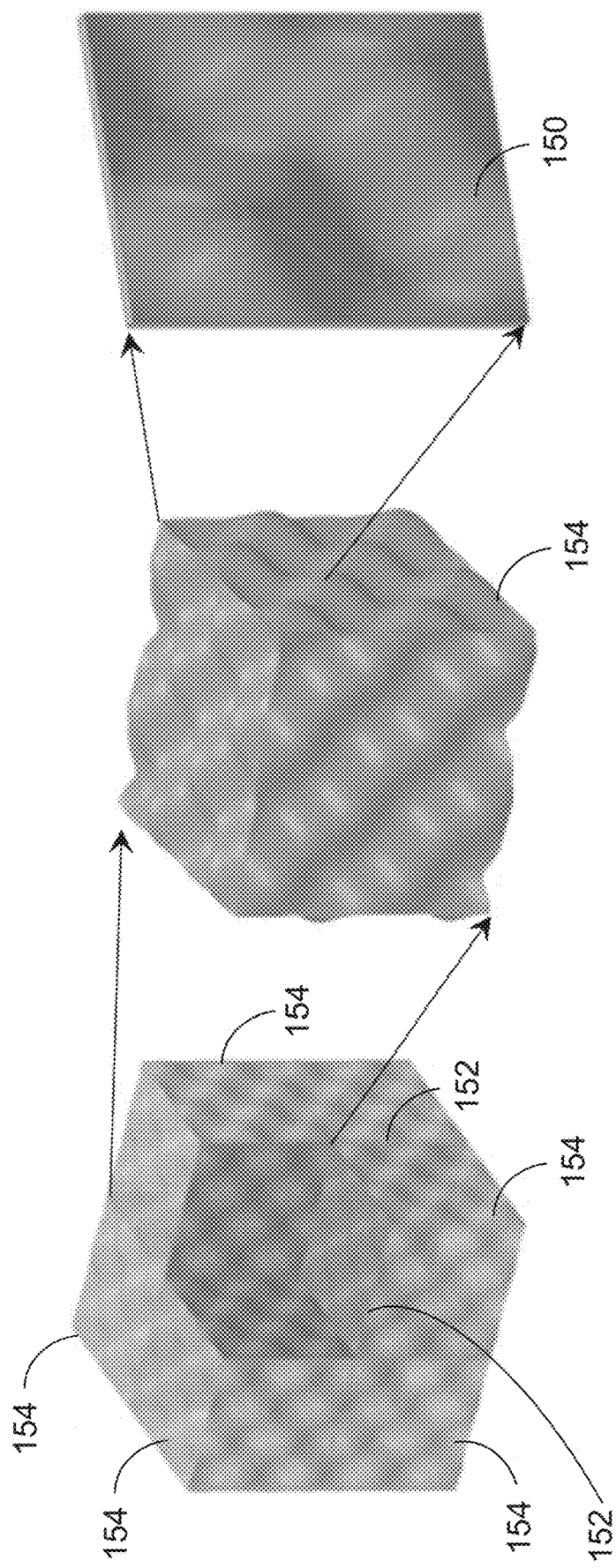

In accordance with various embodiments, a variety of 3D auxetic composite structures are possible, including both regular and arbitrarily-shaped (irregular) polyhedral building blocks. FIG. 2A shows examples of regular designs, which are based on convex polyhedral shapes with regular faces: a cube 130, a hexagonal prism 132, a triangular prism 134, a truncated octahedron 136, and a gyrobifastigium 138. FIG. 2B shows an example of an irregular design, specifically a Voronoi polyhedra 140. In these polyhedral designs, the flat interfaces between two neighboring building blocks are replaced by 3D wavy interfacial layers 150 as shown in FIG. 2C. The waveform, wavelength and amplitude of the wavy interfacial layers 150 can be varied to achieve desired properties. In general, the waveform can be different 3D wavy surfaces with either only one wavelength (such as the design shown in FIG. 1A) or multi wavelengths, as shown in FIG. 2C. In the FIG. 2C embodiment, a soft layer 152 is disposed between adjacent building blocks 154.

Figure 3A:
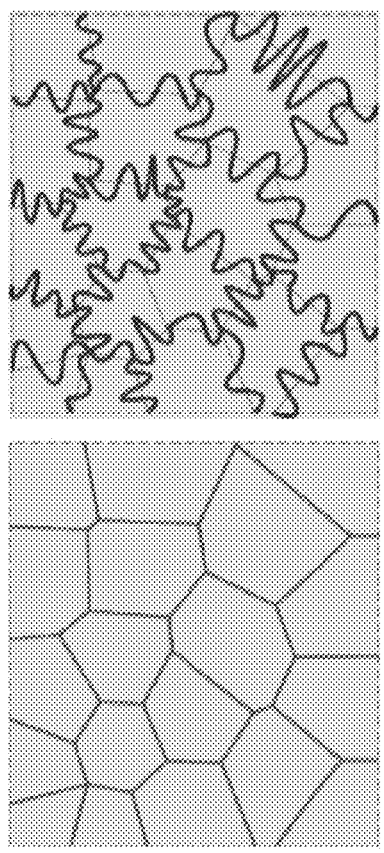
FIG. 3A illustrates irregular auxetic composite structures in accordance with one or more embodiments (cell irregularity and irregular wavy geometry).
Figure 3A:
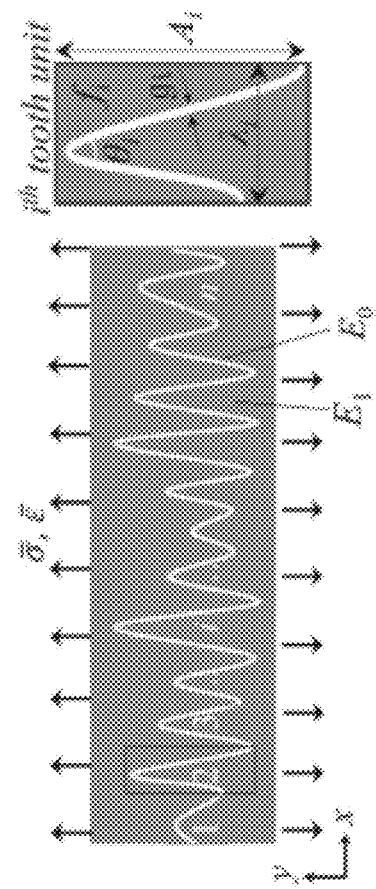

Also, the waveform can be either regular or irregular/random as shown in FIG. 3A. Compared with the designs with regular geometries, the irregular designs can add further engineering benefits. For example, irregular designs can facilitate graceful failure, avoiding catastrophic failure. They can also increase ductility and damage/imperfection tolerance.

Figure 3B:
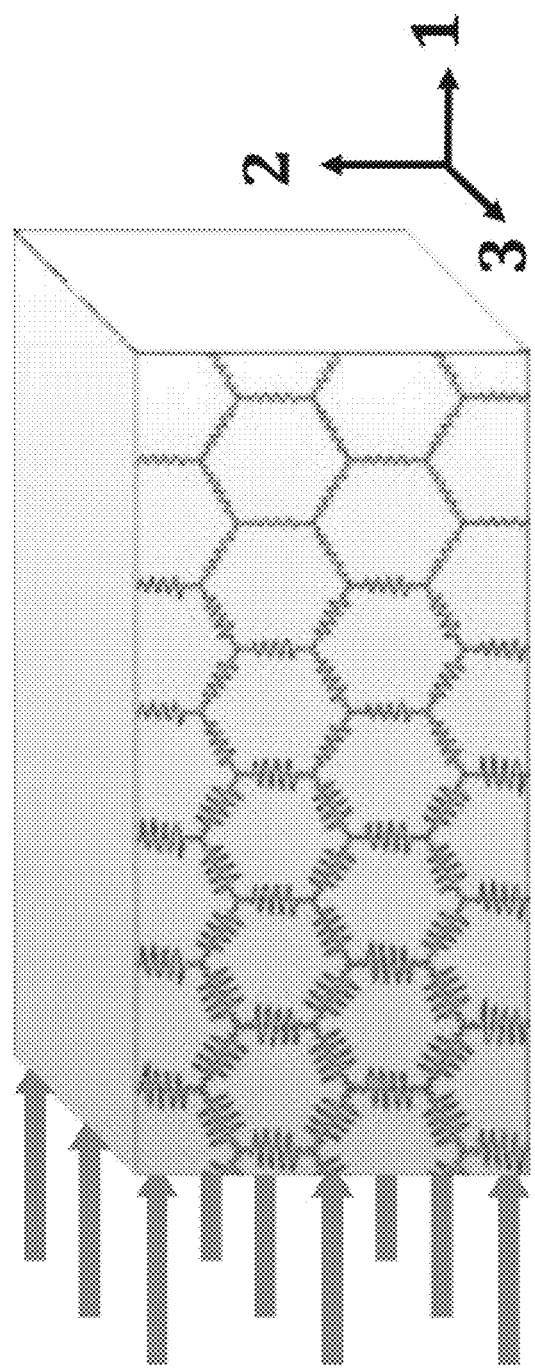
FIG. 3B shows a functionally graded design in accordance with one or more embodiments.

In addition, the design strategy can also be easily extended to design functionally graded materials. For example, by gradually varying the waviness of the wavy layer in space, functionally graded tiled composites can be designed (schematically shown in FIG. 3B). In this way, the mechanical properties including, stiffness, strength, toughness, Poisson's ratio, and damping can be tuned in space to achieve desired performance.

Several engineering advantages are provided by auxetic structures in accordance with various embodiments. The structures provide auxeticity-induced impact resistance. They provide efficient energy dissipation through shear. The structures provide significantly increased shear-induced damping within the material. As a result, the structures can be used for resisting impact loads, mitigating vibrations, and providing robust mechanical support. The structures can be scaled for use as impact-resistant materials for humans, vehicles, and infrastructures, seismic-resistant constructions, and anti-vibration materials.

Auxetic composite structures in accordance with one or more embodiments use local shear to provide damping and dissipate energy to mitigate impact and attenuate vibrations. The effects are shear-induced unlike the auxeticity-induced indentation resistance of conventional auxetic cellular materials.

Additionally, it should be noted that auxetic composite structures in accordance with one or more embodiments can have the effect of an auxeticity-induced 'mechanics cage', which holds the building blocks together under large deformation without presence of a cage.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions.

Accordingly, the foregoing description and attached drawings are by way of example only, and are not intended to be limiting.

What is claimed is:

1. An auxetic structure, comprising:
   a first polyhedral unit and a second polyhedral unit arranged adjacent one another to form a three-dimensional structure, the first polyhedral unit comprising a rigid material and having a protrusion extending orthogonally from a surface and the second polyhedral unit comprising the rigid material and defining a recess formed in a surface thereof, the protrusion of the first polyhedral unit slidingly received in the recess defined by the second polyhedral unit; and
   a wavy sleeve positioned in the recess, said wavy sleeve comprising a softer material than the rigid material
   displacement of the protrusion in the sleeve and recess generating a shear-induced auxetic effect in the auxetic structure.

2. The auxetic structure of claim 1, wherein the structure is configured for use in resisting impact loads, mitigating vibrations, or providing mechanical support based on the shear-induced auxetic effect.

3. The auxetic structure of claim 1, wherein each polyhedral unit has a truncated octahedral geometry.

4. The auxetic structure of claim 1, wherein the polyhedral units have irregular shapes.

5. The auxetic structure of claim 1, wherein the polyhedral units have regular shapes.

6. The auxetic structure of claim 1, wherein the polyhedral units have a cubic shape, a hexagonal prism shape, a triangular prism shape, a truncated octahedron shape, or a gyrobifastigium shape.

7. The auxetic structure of claim 1, wherein the polyhedral units comprise a voronoi polyhedral.

8. The auxetic structure of claim 1, wherein each protrusion has a cylindrical shape.

9. The auxetic structure of claim 1, wherein the auxetic structure provides damping and dissipates energy to mitigate impact and attenuate vibrations through local shear.

10. The auxetic structure of claim 1, the surface comprising a wavy outer surface.

11. An auxetic structure, comprising:
    a first polyhedral unit and a second polyhedral unit arranged adjacent one another to form a three-dimensional structure, the first polyhedral unit comprising a rigid material and including a wavy outer surface having a protrusion and the second polyhedral unit comprising the rigid material and including a wavy outer surface defining a recess thereon, the protrusions of the first polyhedral unit slidingly received in the recess defined by the second polyhedral unit; and a 3D wavy interfacial layer, between adjacent first and second polyhedral units, said 3D wavy interfacial layer comprising a softer material than the rigid material, displacement of the protrusion on the 3D wavy interfacial layer and recess generating a shear-induced auxetic effect in the auxetic structure.

12. The auxetic structure of claim 11, wherein the structure is configured for use in resisting impact loads, mitigating vibrations, or providing mechanical support based on the shear-induced auxetic effect.

13. The auxetic structure of claim 11, wherein the polyhedral units have irregular shapes.

14. The auxetic structure of claim 11, wherein the polyhedral units have regular shapes.

15. The auxetic structure of claim 11, wherein polyhedral units have a cubic shape, a hexagonal prism shape, a triangular prism shape, a truncated octahedron shape, or a gyrobifastigium shape.

16. The auxetic structure of claim 11, wherein the polyhedral units comprise a voronoi polyhedral.

17. The auxetic structure of claim 11, wherein the wavy outer surfaces have a varied waviness to tune mechanical properties of the structure.

18. The auxetic structure of claim 17, wherein the mechanical properties comprise stiffness, strength, toughness, Poisson's ratio, or damping.

19. The auxetic structure of claim 11, wherein the auxetic structure provides damping and dissipates energy to mitigate impact and attenuate vibrations through local shear.

* * * * *